United States Patent [19]

Tolino et al.

[11] Patent Number: 4,759,897
[45] Date of Patent: Jul. 26, 1988

[54] SYSTEM FOR DETERMINING BOW, TWIST AND TILT OF A NUCLEAR FUEL ASSEMBLY

[75] Inventors: Ralph W. Tolino, Wilkinsburg, Pa.; Charles R. Mummert, West Newton, N.C.

[73] Assignee: Westinghouse Electric Corp., Pittsburgh, Pa.

[21] Appl. No.: 902,235

[22] Filed: Aug. 29, 1986

[51] Int. Cl.[4] .............................................. G21C 17/00
[52] U.S. Cl. ................................... 376/245; 376/258; 33/1 M
[58] Field of Search ............ 376/245; 33/1 M, 143 L, 33/147 N

[56] References Cited

U.S. PATENT DOCUMENTS

| | | | |
|---|---|---|---|
| 3,177,121 | 4/1965 | Horowitz et al. | 376/251 |
| 3,511,091 | 5/1970 | Thome | 376/249 |
| 3,894,327 | 7/1975 | Jabsen | 29/400 N |
| 3,901,090 | 8/1975 | Akey et al. | 376/245 |
| 4,036,686 | 7/1977 | Weilbacher et al. | 376/251 |
| 4,058,224 | 11/1977 | Jabsen | 376/261 |
| 4,175,000 | 11/1979 | Jabsen | 376/251 |
| 4,464,332 | 8/1984 | Boisseuil et al. | 376/248 |
| 4,483,205 | 11/1984 | Bellaiche et al. | 376/245 |
| 4,649,650 | 3/1987 | Fink et al. | 33/1 M |

OTHER PUBLICATIONS

U.S. application Ser. No. 06/730,217, filed May 3, 1985, entitled "Nuclear Reactor Fuel Assembly Grid Measuring Method and Device" (Case 52,490), now U.S. Pat. No. 4,649,650.

Primary Examiner—Salvatore Cangialosi

[57] ABSTRACT

An electromechanical measurement system for acquiring dimensional data from a nuclear fuel assembly includes an underwater measurement assembly, support means for mounting same on the edge of a spent fuel pool, and a control and data acquisition and processing unit. The underwater measurement assembly includes an elongated strongback disposable vertically along a pool wall, adjustment mechanism on a support assembly permitting accurate positioning of the strongback. A support plate carries hydraulic clamps for clamping the top nozzle of a fuel assembly while it is supported from overhead, a clamp carried by the lower end of the strongback being engageable with the bottom nozzle for holding the fuel assembly in a selected orientation with the faces of the top nozzle vertical. A chain/motor driven carriage moves vertically and carries a video camera and a plurality of measurement gauges movable in a horizontal plane for engaging each nozzle and grid of the fuel assembly at a plurality of points and measuring the distances of those points from fixed reference planes. A program-controlled computer calculates from the measurements the location of the center of each nozzle and grid in the measurement plane and processes this data to derive bow, twist and tilt measurements for the fuel assembly.

20 Claims, 11 Drawing Sheets

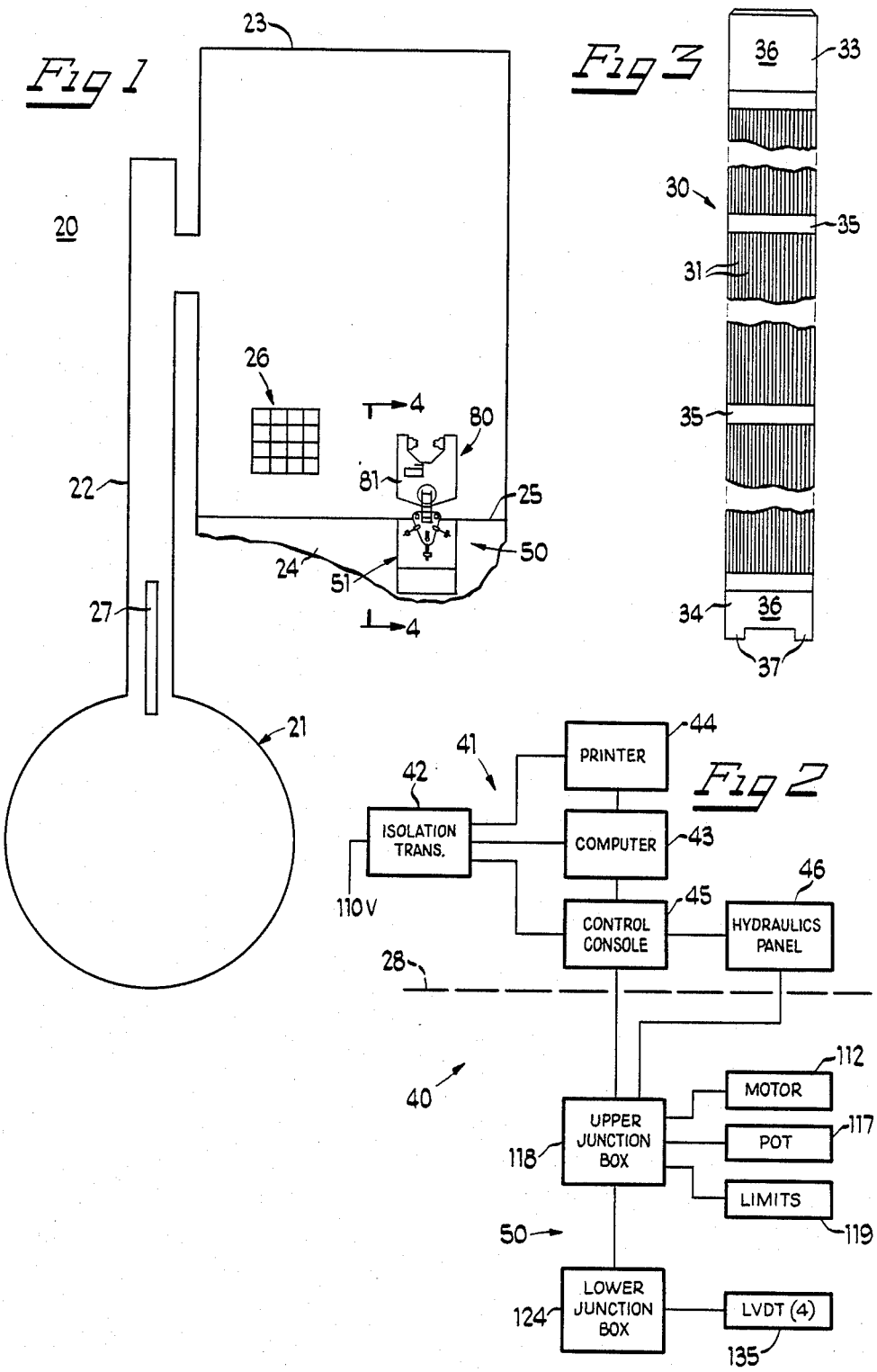

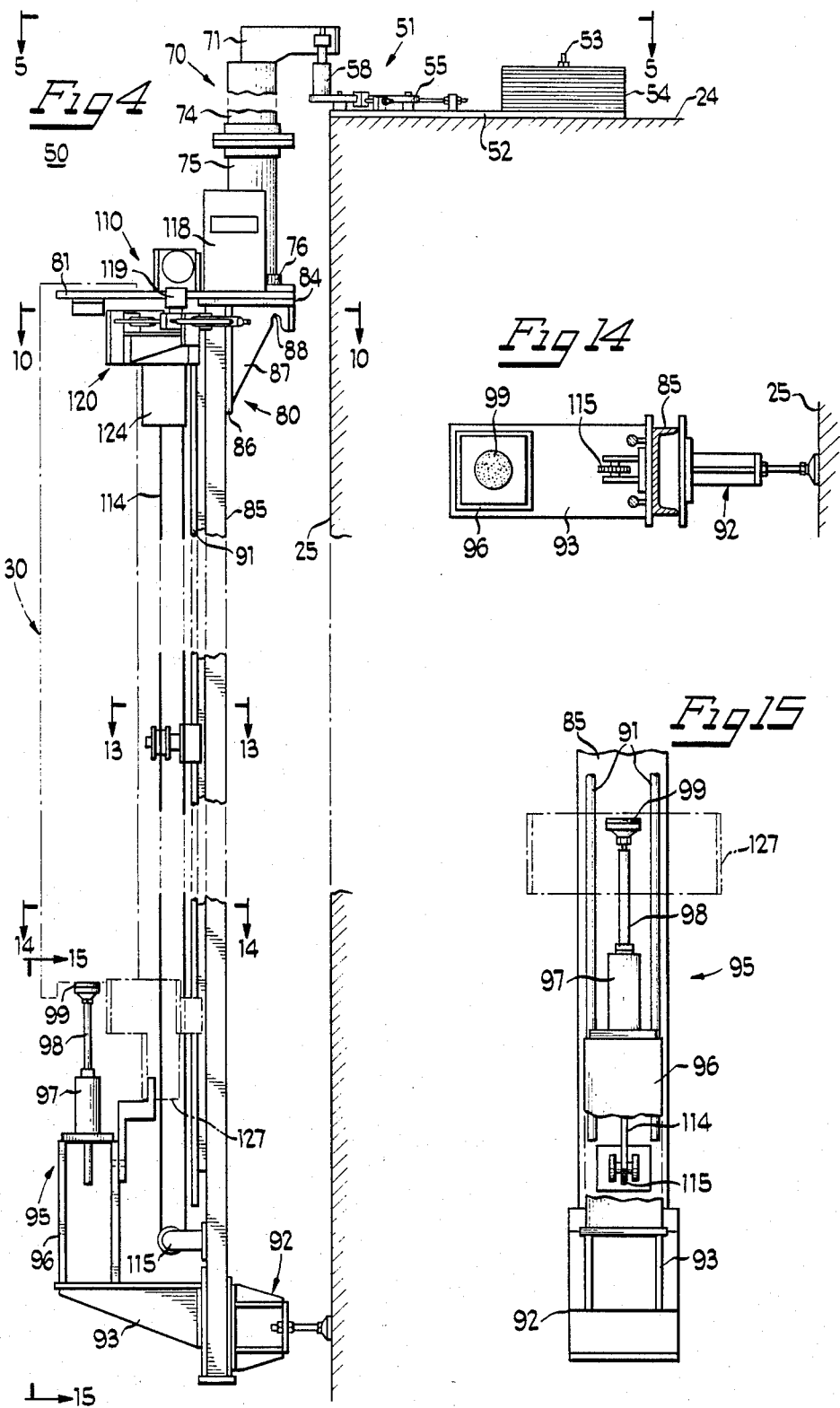

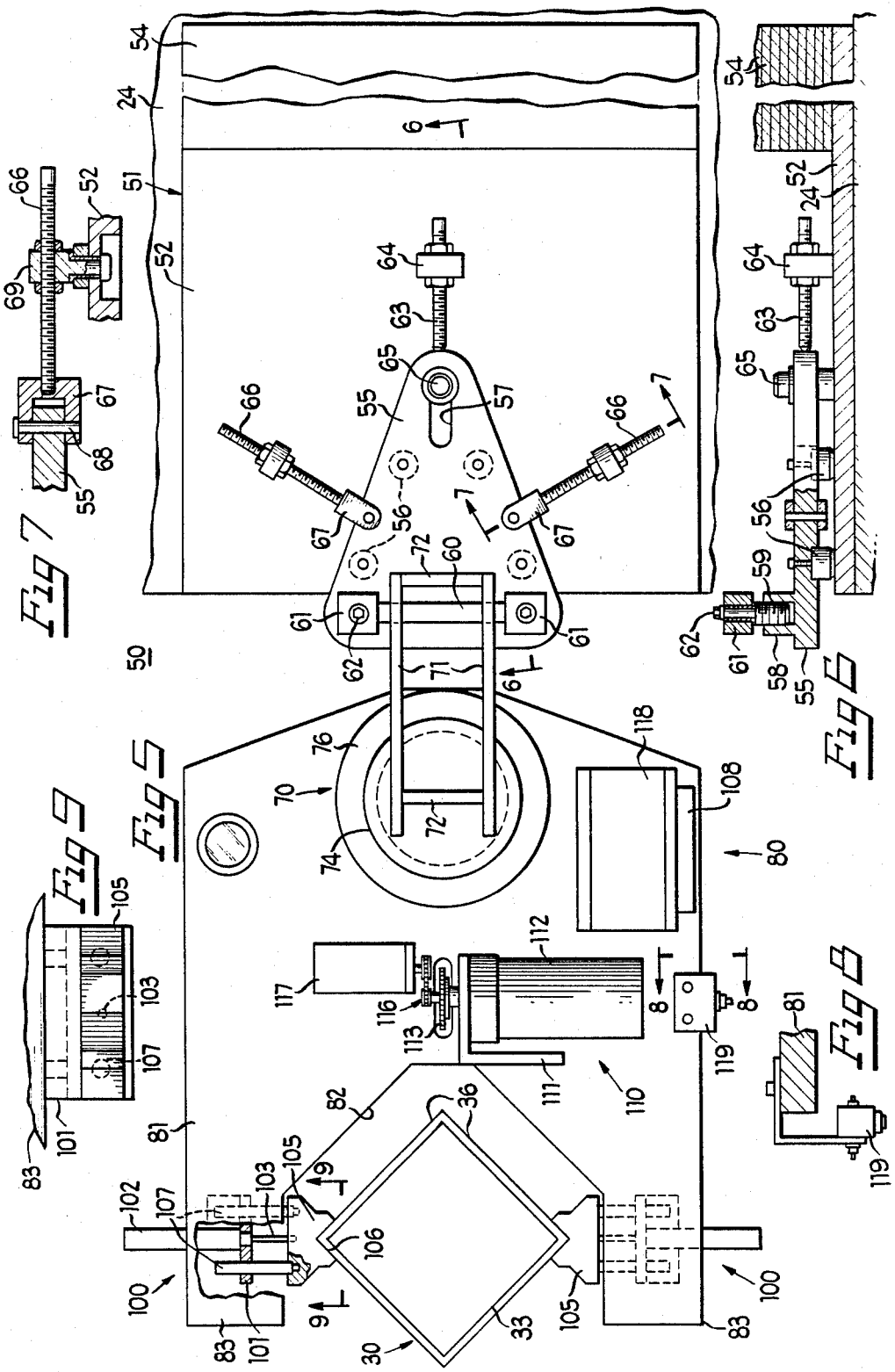

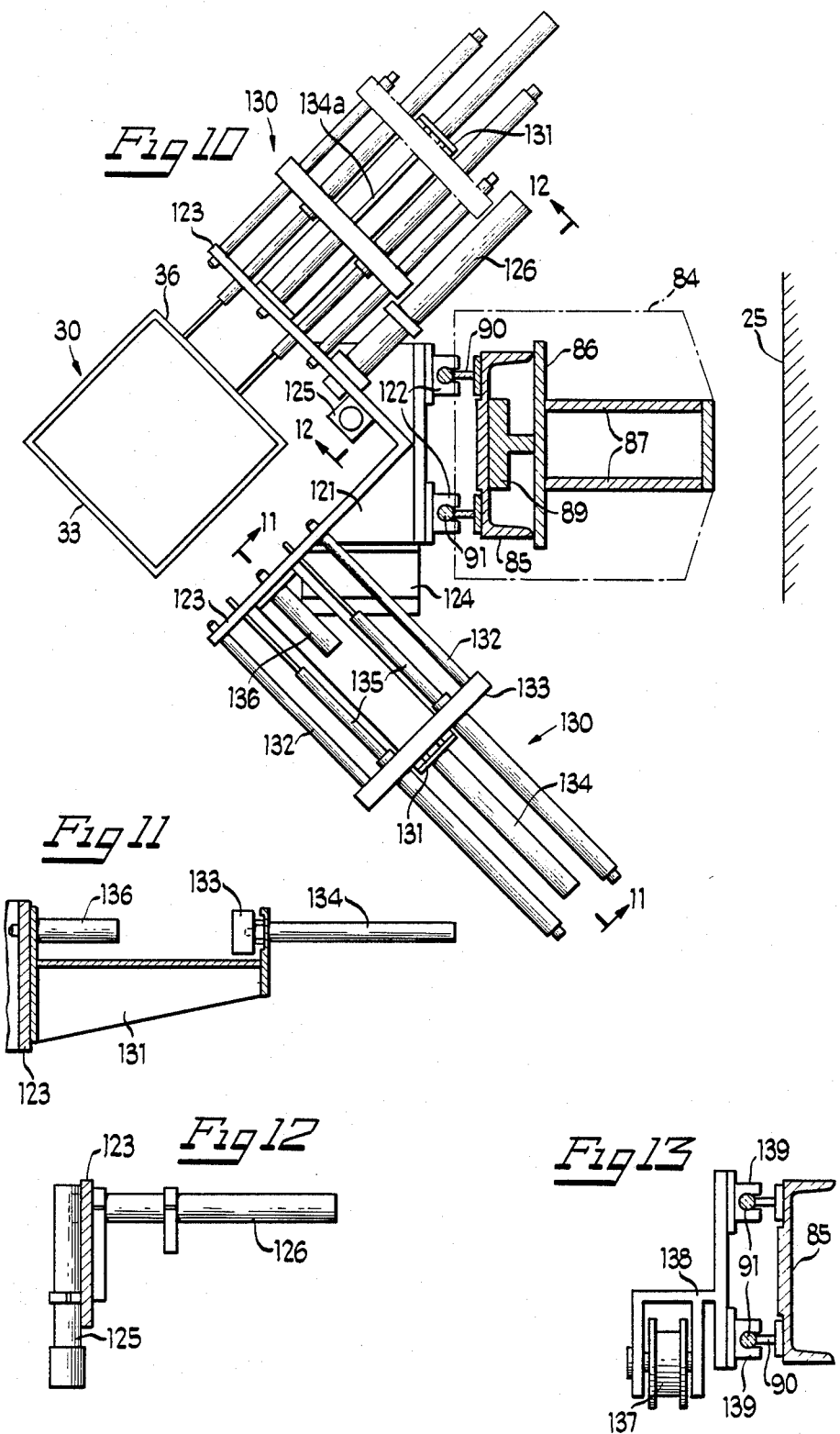

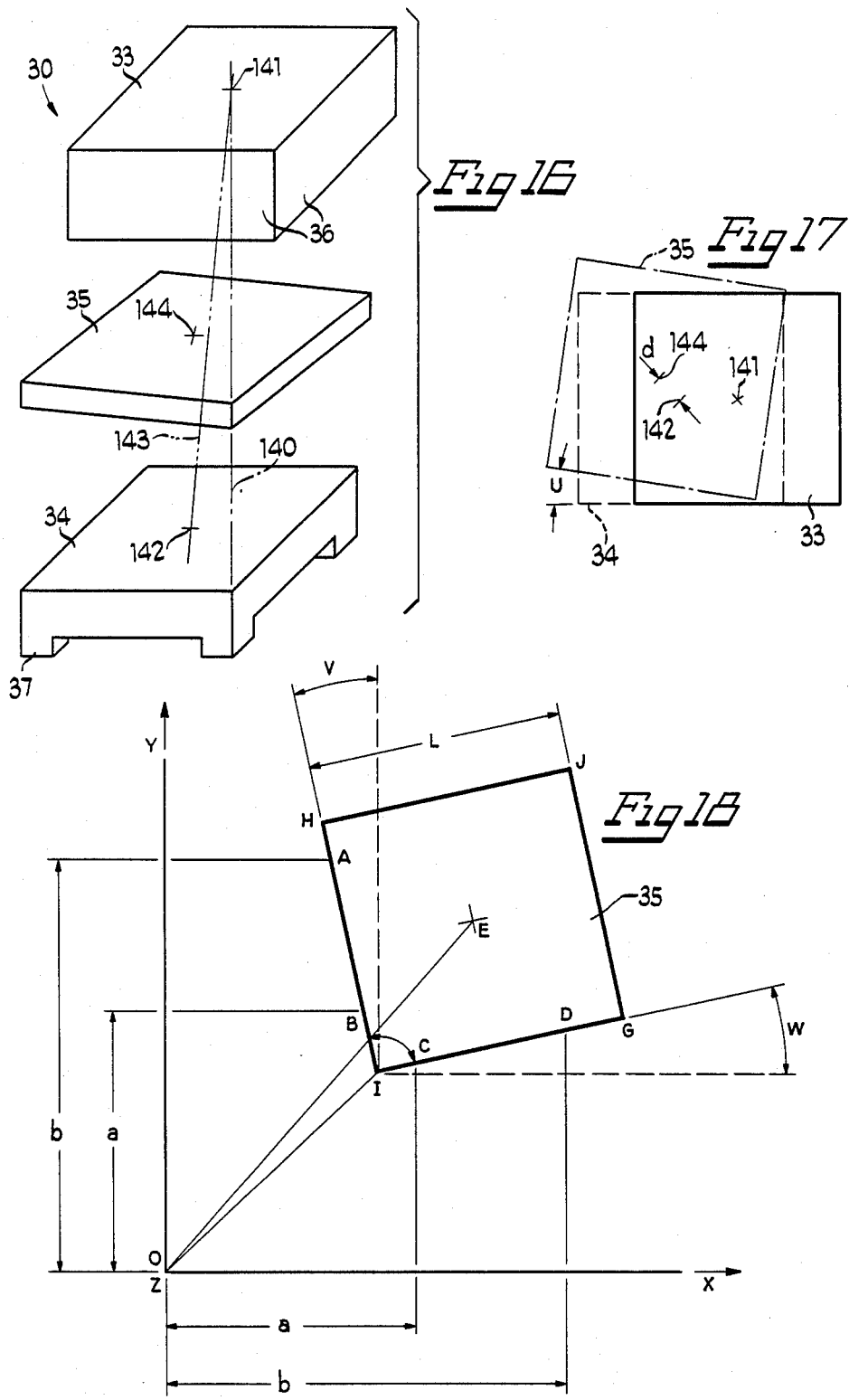

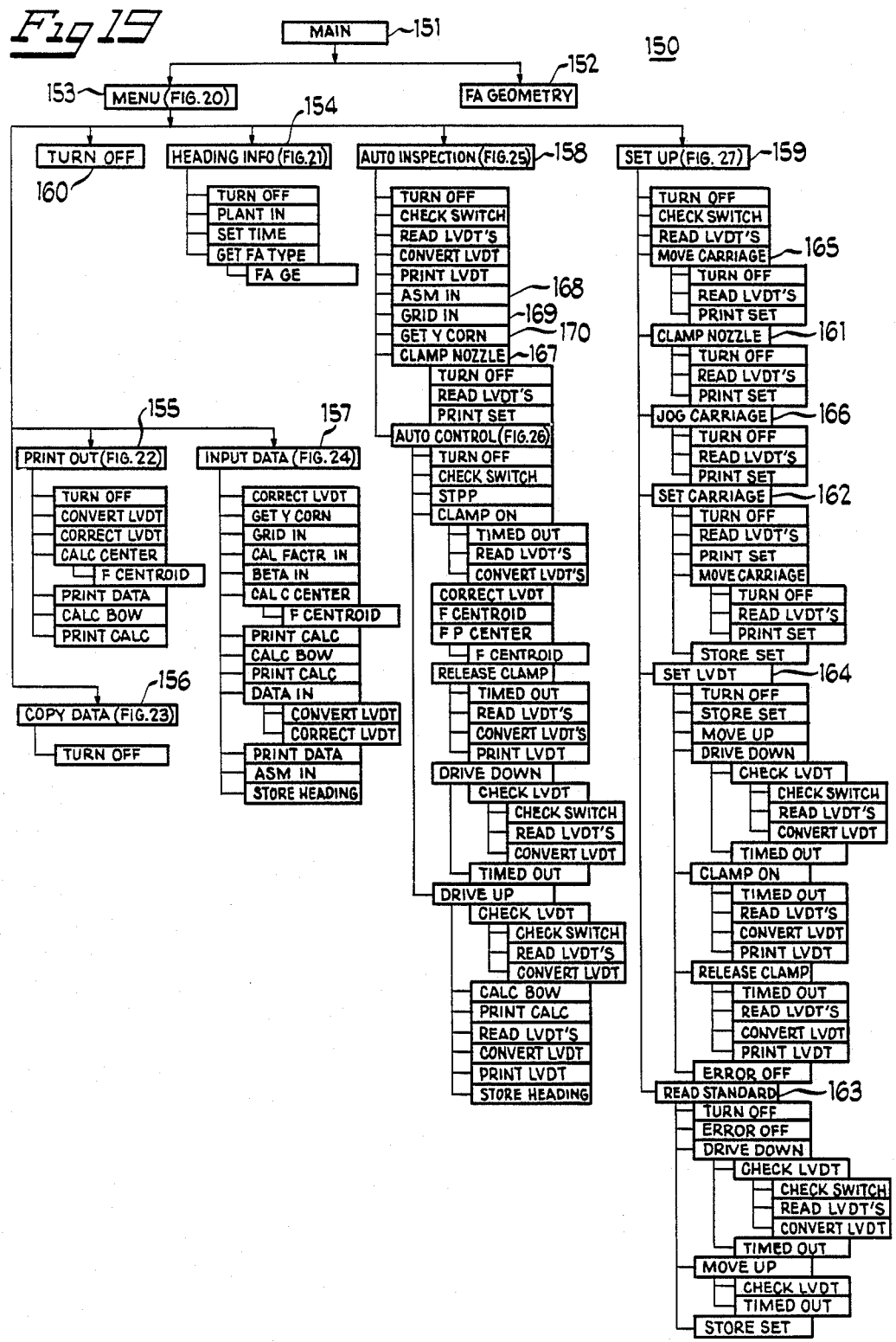

SYSTEM FOR DETERMINING BOW, TWIST AND TILT OF A NUCLEAR FUEL ASSEMBLY

BACKGROUND OF THE INVENTION

1. Field of the Invention

The present invention relates to apparatus for determining external dimensional relationships of three-dimensional objects for ascertaining distortion thereof. In particular, the invention relates to apparatus for determining such dimensional relationships and distortion data in irradiated nuclear fuel assemblies.

A nuclear fuel assembly typically comprises an array of elongated fuel rods and control rods engaged with and held in position by a plurality of grids longitudinally spaced-apart between top and bottom nozzles. In a typical reactor core, there may be between 160 and 190 such fuel assemblies, each fuel assembly including approximately 200 fuel rods, and each being held in place by retaining springs.

Prior to use, each fuel assembly is substantially straight, the fuel pins and associated control rods for the fuel assembly all being parallel to each other and perpendicular to the top and bottom nozzles and to the grids. However, each reactor cycle results in a certain amount of distortion of the fuel assembly. This distortion includes "bow", "twist" and "tilt". "Bow" is defined as the deviation of the centroid of each grid from a straight line connecting the centroids of the top and bottom nozzles. "Twist" is defined as the angular rotation of each grid with respect to a zero reference plane defined by one face of the top nozzle. "Tilt" is defined as the distance between the centroid of the bottom nozzle and a vertical line passing through the centroid of the top nozzle. After each refueling cycle, fuel assemblies are moved to different locations in the reactor core, new fuel assemblies being added along the outside or periphery of the core and being gradually moved inwardly toward the center. After about three refueling cycles, a fuel assembly will reach the center of the core and become spent, these spent assemblies being removed during the next refueling. Each fuel assembly has locating holes in the bottom nozzle for receiving locating pins in the bottom core plate, accurately to position the fuel assembly in the reactor core. The above-described distortion can prevent accurate alignment of the bottom nozzle with these locating pins during repositioning of the fuel assemblies.

Furthermore, because of newer fuel assembly design utilizing thinner walls and higher spring forces for retaining the fuel assembly in place, bow is becoming even more of a problem than heretofore. Deformation of as little as one-half inch can prevent accurate resetting of a fuel assembly in a new location in the reactor core.

2. Description of the Prior Art

Previously, bow has been measured by hanging a measurement plate with horizontal rulings in front of the fuel assembly and reading the bow against the ruled markings, and thereby estimating the amount of bow in the fuel assembly. Alternatively, a closed circuit TV camera may be moved along the periphery of the fuel assembly, the camera movement being monitored to provide an estimate of a fuel assembly bow. Both of these prior techniques are time consuming and relatively inaccurate. Heretofore, no means has been available for making adequate tilt and twist measurements, and such measurements have generally not been attempted.

SUMMARY OF THE INVENTION

It is a general object of the present invention to provide an improved system for determining external dimensional relationships of nuclear fuel assemblies, which system avoids the disadvantages of prior techniques while affording additional structural and operating advantages.

An important object of the present invention is the provision of a system of the type set forth which permits measurement of tilt and twist as well as bow of nuclear fuel assemblies.

In connection with the foregoing object, it is another object of the present invention to provide a system of the type set forth which provides accurate and precise measurements.

Still another object of the invention is the provision of a system of the type set forth which is capable of remotely-controlled underwater operation.

Yet another object of the invention is the provision of a system of the type set forth which is relatively lightweight and portable.

It is still a further object of the invention to provide a measurement system of the type set forth which can effect measurements on a fuel assembly when it is in an essentially free-hanging condition on a handling tool, without any need for releasing and reengaging the fuel assembly with respect to the handling tool.

Yet another object of the invention is the provision of a measurement system of the type set forth which permits all measurements to be made with respect to references determined relative to the top nozzle of the fuel assembly, thereby obviating positioning of the fuel assembly at a precise location.

These and other objects of the invention are attained by providing apparatus for determining external dimensional relationships of a nuclear fuel assembly including an array of elongated fuel rods engaged in transverse grids and extending between top and bottom nozzles, the apparatus comprising: support means, positioning means on the support means for fixedly positioning the fuel assembly in a predetermined orientation to establish a portion of the fuel assembly as a reference, carriage means mounted on the support means for movement longitudinally with respect to the fuel assembly substantially the entire length thereof when it is disposed in the predetermined orientation, measuring means on the carriage means, and drive means on the carriage means for moving the measuring means between a retracted condition and a measuring condition disposed in measuring engagement with the fuel assembly to measure dimensional relationships thereof relative to said reference thereon.

The invention consists of certain novel features of a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a diagrammatic top plan view of a nuclear reactor installation, illustrating the positioning of the measurement system of the present invention;

FIG. 2 is a functional block diagram of the measurement system of the present invention;

FIG. 3 is a side elevational view of a nuclear fuel assembly on which measurements are taken with the present invention;

FIG. 4 is an enlarged side elevational view, taken generally along the line 4—4 in FIG. 1, of the underwater measurement assembly of the measurement system of the present invention, shown mounted in a spent fuel pool, illustrating an associated fuel assembly to be measured, and with portions broken away more clearly to illustrate the construction;

FIG. 5 is a further enlarged, top plan view of the underwater measurement assembly of FIG. 4, taken along the line 5—5 therein, and with portions broken away more clearly to show the construction;

FIG. 6 is a fragmentary view in vertical section taken along the line 6—6 in FIG. 5;

FIG. 7 is an enlarged fragmentary view in vertical section taken along the line 7—7 in FIG. 5;

FIG. 8 is an enlarged fragmentary view in vertical section taken along line 8—8 in FIG. 5;

FIG. 9 is an enlarged fragmentary view in vertical section taken along the line 9—9 in FIG. 5;

FIG. 10 is a further enlarged view in horizontal section taken along the line 10—10 in FIG. 4;

FIG. 11 is a fragmentary view in vertical section taken along the line 11—11 in FIG. 10;

FIG. 12 is a view in vertical section taken along the line 12—12 in FIG. 10;

FIG. 13 is a further enlarged view in horizontal section taken along the line 13—13 in FIG. 4;

FIG. 14 is a further enlarged view in horizontal section taken along the line 14—14 in FIG. 4;

FIG. 15 is a further enlarged fragmentary front elevational view, taken generally along the line 15—15 in FIG. 4, of the bottom clamp assembly of the underwater measurement assembly, with portions broken away more clearly to illustrate the construction;

FIG. 16 is a diagrammatic perspective view of portions of the nuclear fuel assembly, illustrating the types of measurements made with the present invention;

FIG. 17 is a diagrammatic top plan view of the fuel assembly of FIG. 16;

FIG. 18 is a diagrammatic representation to illustrate the manner in which bow and twist and tilt characteristics are calculated; and FIGS. 19-27 comprise a flow chart representation of the program for the computer of the system of FIG. 2.

DESCRIPTION OF THE PREFERRED EMBODIMENT

Figure 20:
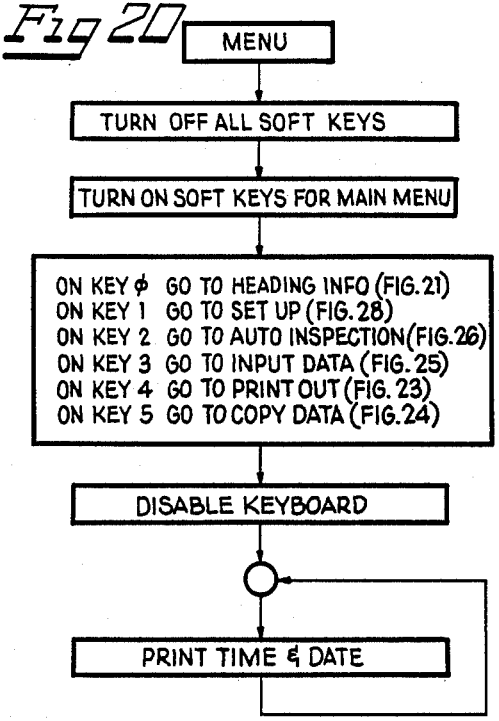

Referring to FIG. 1, there is illustrated a nuclear reactor installation 20, including a reactor core 21, interconnected by a transfer canal 22 with a spent fuel pool 23, which is sunk beneath the deck 24 of a spent fuel building (not shown). The spent fuel pool 23 is generally rectangular in shape, comprising four vertical walls 25 and filled with water to a level 28 (FIG. 2). Mounted in the spent fuel pool 23 are a plurality of storage racks 26 (only several illustrated).

Typically, there are disposed in the reactor core 21 between 160 and 190 nuclear fuel assemblies 30 (see FIG. 3). Periodically, during refueling operations, spent fuel assemblies 30 are removed from the reactor core 21 and the remaining fuel assemblies 30 are rearranged within the reactor core 21, fresh, unused fuel assemblies 30 being added around the outer perimeter of the reactor core 21 and partially spent fuel assemblies 30 being moved radially inwardly toward the center. Typically, after about three such refueling cycles, a nuclear fuel assembly 30 will reach the center of the reactor core 21 and be completely spent. Spent fuel assemblies 30 are removed through the transfer canal 22 to the spent fuel pool 23 by transport means (not shown). Also, partially spent fuel assemblies 30 may be moved to the spent fuel pool 23 for service procedures, including measurements of the kind for which the present invention is used. An upender 27 shifts the fuel assembly 30 from its vertical orientation in the reactor core 21 to a horizontal orientation for transport along the transfer canal 22. The fuel assembly 30 is then again shifted to a vertical position and transferred by an overhead handling crane (not shown) to the spent fuel pool 23, the complete fuel assembly 30 being deposited in one of the storage racks 26, all in a known manner.

Referring to FIG. 3, a typical fuel assembly 30 includes a cluster of approximately 200 elongated, parallel fuel rods 31, arranged in a substantially square configuration and extending between a top nozzle 33 and a bottom nozzle 34, each generally in the form of a rectangular block. The entire fuel assembly 30 is approximately 160 inches in overall length. The proper spacing of the fuel rods 31 in the rectangular configuration, is maintained by a plurality of spaced-apart grids 35, which may typically be spaced about two feet apart. Each of the nozzles 33 and 34 and the grids 35 is substantially square in transverse cross section, the nozzles 33 and 34 each being provided with four substantially planar external faces 36 arranged to be substantially parallel, respectively, with the four sides of each of the grids 35. The bottom nozzle 34 has four depending support pedestals 37, two of which contain locating receptacles (not shown) for respectively receiving locating pins in the reactor core 21, accurately to position the fuel assembly 30 therein.

Referring to FIGS. 16 and 17, the fuel assembly 30 may, in use, undergo dimensional distortion which may be of several types, including "bow", "twist" and "tilt". More particularly, if the top nozzle 33 is arranged with its faces 36 vertical, the tilt of the fuel assembly 30 is defined as the distance from the centroid 142 of the bottom nozzle 34 to a vertical line 140 passing through the centroid 141 of the top nozzle 33. The centroids 141 and 142 are approximated by the centers of squares defined by the intersection of the faces 36 of the top and bottom nozzles 33 and 34 with horizontal planes passing therethrough. The bow of the fuel assembly 30 at a grid 35 is defined as a deviation of the centroid 144 of the grid 35 from a straight line 143 connecting the centroids 141 and 142 of the top and bottom nozzles 33 and 34. The centroid 144 of a grid 35 is approximated by the center of a square defined by the intersection of the side faces of the grid 34, when oriented vertically with a horizontal plane passing therethrough. The twists of the fuel assembly 30 at a grid 35 is defined as the angular rotation of the grid 35 from a reference plane defined by a face 36 of the top nozzle 33. Bow and tilt are measured in inches and the twist angle is measured in degrees.

Referring to FIG. 2 there is illustrated a measurement system, generally designated by the numeral 40, constructed in accordance with and embodying the features of the present invention, for determining the bow, twist and tilt of a nuclear fuel assembly. The measurement system 40 includes a control and processing unit 41 which is disposed outside the spent fuel pool 23, preferably remote therefrom, and an underwater measurement assembly 50 which is mounted on the deck 24 of the spent fuel pool 23, and which extends in use below the water level 28 in the spent fuel pool 23. The control and processing unit 41 includes an isolation transformer 42 coupled to an associated source of AC power and to a computer 43, a printer 44 and a control console 45, the computer 43 also being connected to the printer 44 and the control console 45, the latter being in turn connected to a hydraulics panel 46 for controlling the hydraulic operation of the measurement system 40.

The underwater measurement assembly 50 includes an upper junction box 118 which is connected by cabling to the control console 45 and by tubing to the hydraulics panel 46, the upper junction box 118 being mounted in a fixed position. The upper junction box 118 is connected to a lower junction box 124 mounted on movable parts of the underwater measurement assembly 50. The upper junction box 118 is also electrically connected to a motor 112, a potentiometer 117 and two limit switches 119, these parts all being mounted in fixed positions. The lower junction box 124 is connected to four movable measuring gauges 135.

The underwater measurement assembly 50 is the portion of the measurement system 40 which is submerged in the spent fuel pool 23 or the transfer canal 22 and in which the spent fuel assembly 30 is positioned for measurement. The control and processing unit 41 is a computer-based unit, the computer being used to control the sequence of operations and to perform the calculations required to convert the raw data from the measurement gauges 135 into bow, twist and tilt form. The use of the computer 43 allows for a fully automatic mode of operation which can significantly reduce required measurement times and operator fatigue. In addition, the computer 43 can be bypassed to allow manual control of system functions. The control and processing unit 41 is programmable to accommodate differences among types of fuel assemblies.

Referring now to FIGS. 4–15, the underwater measurement assembly 50 includes a support assembly 51 which is coupled by a mast assembly 70 to a frame 80, on which are mounted a lower clamp assembly 95 and an upper clamp assembly 100 (FIG. 10) for positioning a fuel assembly 30 with respect to the frame 80. A drive assembly 110 is coupled to the frame 80 and drives a carriage assembly 120 along the frame 80, longitudinally of the associated fuel assembly 30, the carriage assembly 120 carrying a pair of measuring units 130 for effecting the required measurements.

Referring in particular to FIGS. 4–7, the support assembly 51 includes a flat, rectangular base plate 52 which is adapted to be disposed on the deck 24 of the spent fuel pool 23, the forward edge of the base plate 52 preferably being disposed substantially flush with the upper edge of one of the walls 25 of the spent fuel pool 23. Integral with the rear end of the base plate 52 and projecting upwardly therefrom are one or more threaded studs 53, adapted to be received through the complementary openings in a plurality of counterweights 54, which may be stacked on the base plate 52 and secured in place by suitable nuts engaged with the studs 53 to hold the support assembly 51 in place.

Overlying the base plate 52, substantially parallel thereto, is a generally triangular support plate 55 provided with a plurality of spaced-apart support pads 56 depending therefrom for engagement with the base plate 52. Formed adjacent to the apex of the support plate 55 is an elongated slot 57, for a purpose to be explained more fully below. Integral with the forward end of the support plate 55 are two laterally spaced-apart, upstanding sockets 58 in which are respectively threadedly received two studs 59. A mounting bar 60 spans the sockets 58, the bar 60 being provided at its opposite ends with end blocks 61 having bores therethrough for respectively receiving the upper ends of the studs 59. Adjusting nuts 62 being provided on the studs 59 to move the studs 59 up or down for thereby adjusting the inclination of the bar 60.

The support assembly 51 also includes a fore and aft adjusting screw 63, threadedly engaged in a lug 64 and bearing against the rear end of the support plate 55. A screw 65 extends through the slot 57 and is threaded into the base plate 52. The lug 64 is fixed to the base plate 52. Thus, by rotation of the screw 63, the fore and aft position of the support plate 55 may be set, after which the screw 65 is tightened to lock the support plate 55 against forward movement. There are also provided a pair of side adjusting screws 66, respectively coupled at their forward ends by clevis links 67 to side edges of the support plate 55 by pivot pins 68 (FIG. 7). The screws 66 are respectively threaded in lugs 69 which are fixed to the base plate 52. Thus, it will be appreciated that the screws 66 may be utilized to effect lateral or side-to-side adjustment of the position of the support plate 55.

In use, the support assembly 51 is preferably arranged so that the forward end of the support plate 55 projects beyond the forward end of the base plate 52 over the spent fuel pool 23, the orientation of the support plate 55 and the mounting bar 60 being adjusted so that the mounting bar 60 is disposed substantially horizontally and substantially parallel to the adjacent wall 25 of the spent fuel pool 23.

The mast assembly 70 includes a pair of laterally spaced-apart, vertical plates 71 interconnected at the forward and rearward ends thereof by braces 72. Formed in the underside of the plates 71 adjacent to the rearward ends thereof are hooks (not shown) adapted to fit over the mounting bar 60 for supporting the mast assembly 70 in cantilever fashion. Integral with the plates 71 at their forward ends is a cylindrical upper mast section 74, which depends from the plates 71 and may be coupled to a mast extension 75, which may be used to provide additional length to the mast assembly 70, if desired for particular applications. The upper mast section 74 and the mast extension 75 are both provided at their lower ends with a mounting flange 76, adapted to be fixedly secured to the frame 80 for supporting same beneath the water level 28 of the spent fuel pool 23.

Referring now to FIGS. 4, 5 and 10, the frame 80 includes a top plate 81, to the rear end of which the bottom of the mast assembly 70 is fixedly secured. The forward end of the top plate 81 is provided with a cutout 82 which defines a pair of arms 83. Fixedly secured to the underside of the top plate 81 parallel thereto is a flat mounting plate 84 (FIG. 4), which is in turn fixedly secured to the upper end of an elongated strongback 85.

The strongback 85 is channel-shaped in transverse cross section, opening rearwardly toward the adjacent wall 25 of the spent fuel pool 23, extends substantially perpendicular to the top plate 81, and has a length substantially greater than the overall length of an associated fuel assembly 30.

Spanning the legs of the strongback 85 and fixedly secured thereto at the upper end thereof is a rectangular plate 86 to which are fixedly secured a pair of laterally spaced apart, and rearwardly extending gussets 87. Each of the gussets 87 has formed in its bottom edge a hook 88. In use, the hooks 88 may be mounted directly on the mounting bar 60, in certain applications to aid in installation of the frame 80. Preferably, a stiffener bar 89, generally T-shaped in transverse cross section, is secured to the rear wall of the strongback 85 between the legs thereof for reenforcement purposes (FIG. 10). Integral with the strongback 85 and projecting forwardly therefrom are a pair of laterally spaced-apart webs 90 each integral at its distal edge with an elongated rail 91 (FIGS. 10 and 13). The rails 91 are parallel and extend longitudinally of the strongback 85 a substantial portion of the length thereof. Fixedly secured to the strongback 85 adjacent to the lower end thereof and projecting rearwardly therefrom is a standoff assembly 92, adapted to engage the adjacent wall 25 of the spent fuel pool 23 and being adjustable to cooperate with the support assembly 51 to support the frame 80 in a use orientation with the strongback 85 disposed substantially vertically.

Fixedly secured to the strongback 85 adjacent to the lower end thereof and projecting forwardly therefrom is a support bracket 93 on which is mounted the lower clamp assembly 95. More particularly, the lower clamp assembly 95 may include an upstanding pedestal 96 which carries at its upper end a hydraulic cylinder 97, the piston rod 98 of which projects vertically upwardly and carries at its upper end a support pad 99 adapted to engage the bottom nozzle 34 of an associated fuel assembly 30.

Respectively mounted on the arms 83 of the top plate 81 are the two upper clamp assemblies 100, which are substantially identical in construction, wherefore only one will be described in detail. Each of the upper clamp assemblies 100 includes a mounting bracket 101 which is fixedly secured to the arm 83 and depends therefrom. Mounted on the mounting bracket 101 is a hydraulic cylinder 102 which is disposed with the piston rod 103 thereof projecting horizontally forwardly into the cutout 82 between the arms 83 of the top plate 81. Fixedly secured to the piston rod 103 at its distal end is a clamping jaw 105 provided with a V-shaped notch 106 therein. Also fixedly secured to the clamping jaw 105 are the forward ends of a pair of guide rods 107 which extend horizontally through complementary openings in the mounting bracket 101. The hydraulic cylinders 102 and 97 are coupled by suitable conduits (not shown) to a hydraulic manifold 108 (FIG. 5) mounted on the top plate 81, and in turn coupled through the remote hydraulic panel 46 to an associated source of pressurized hydraulic fluid.

In operation, the associated fuel assembly 30 to be measured is moved by means of its overhead handling crane into position with the top nozzle 33 in the cutout 82 of the top plate 81, and the cylinders 102 are operated to move the clamping jaws 105 respectively into clamping engagement with opposite corners of the top nozzle 33. Thus, it will be appreciated, as can be seen in FIG. 5, that the V-shaped notch 106 of each clamping jaw 105 engages adjacent faces 36 of the top nozzle 33, the support assembly 51 being arranged so that when the fuel assembly 30 is thus clamped in position, the faces 36 of the top nozzle 33 are arranged substantially vertically. When the top nozzle 33 has been thus clamped in position, the lower clamp assembly 95 is elevated by operation of the cylinder 97 to bring the support pad 99 into engagement with the bottom nozzle 34. Thus, the upper and lower clamp assemblies 100 and 95 cooperate fixedly to position the fuel assembly 30 in a substantially vertical orientation for measurement. It will be appreciated that, at all times, the fuel assembly 30 is supported by its associated overhead handling crane, the clamp assemblies 95 and 100 serving only to laterally position the fuel assembly 30 and hold it in its predetermined measurement orientation against any lateral forces which might be applied by the measuring apparatus, as described below.

The drive assembly 110 is carried by the top plate 81, and includes an upstanding bracket 111 to which is fixedly secured the electric drive motor 112. Secured to the output shaft of the motor 112 is a sprocket 113 which engages a drive chain 114 which extends downwardly through a complementary opening in the top plate 81 in front of the strongback 85, the chain 114 being engaged with a bottom sprocket 115, carried by the strongback 85 immediately above the support bracket 93 (FIGS. 14 and 15). The output shaft of the motor 112 is also coupled by a sprocket and chain coupling 116 to a rotary potentiometer 117 which is mounted on the top plate 81. The electrical conductors (not shown) for the motor 112 and the potentiometer 117 are coupled through the junction box 118 mounted on the top plate 81, and thence to the remote control console 45. Also carried by the top plate 81 and depending therefrom along one side edge thereof is a limit switch 119 (FIGS. 5 and 8), a similar switch (not shown) being provided near the lower end of the frame 80 for a purpose to be explained below.

Referring in particular to FIGS. 4 and 10-13, the carriage assembly 120 is fixedly secured to the drive chain 114 by a suitable coupling means (not shown). The carriage assembly 120 includes a mounting bracket 121 provided with two rearwardly projecting bearings 122, which are respectively disposed in sliding engagement with the rails 91 for guiding vertical movement of the carriage assembly 120 by means of the drive chain 114. Fixedly secured to the mounting bracket 121 are two mutually perpendicular rectangular support plates 123, disposed substantially perpendicular to the top plate 81 so as to be respectively parallel to the inner two faces 36 of the top nozzle 33 of the fuel assembly 30 when it is clamped in its measurement position in the frame 80, as illustrated in FIGS. 4, 5 and 10. Carried by the mounting bracket 121 is the junction box 124 which is electrically connected to the junction box 118. Mounted on one of the support plates 123 and depending therefrom is a light 125 for illuminating the region of the fuel assembly 30 being measured, so that it can be viewed on an underwater closed circuit TV camera 126, which is fixedly secured on the same support plate 123 (see FIGS. 10-12). Fixedly secured to the lower clamp assembly 95 and projecting rearwardly therefrom at substantially the level of the lower end of the fuel assembly 30 when it is mounted in its measurement position, is a check plate 127 which is used to verify the repeatability of the measurement tests conducted with the measurement system 40.

Respectively carried by the suport plates 123 are two measuring units 130 (FIG. 10) which are substantially identical in construction, wherefore only one will be described in detail. Each of the measuring units 130 includes a support bracket 131 which is coupled to the support plate 123 and projects rearwardly therefrom. Also fixedly secured to the support plate 123 and projecting rearwardly therefrom are a pair of parallel guide rods 132 which extend through the complementary openings in a slide plate 133 for guiding the sliding movement thereof. A hydraulic cylinder 134 is fixedly secured to the support bracket 131, and has a piston rod 134a (FIG. 11) which is fixedly secured to the slide plate 133 for effecting fore and aft reciprocating movement thereof. Carried by the slide plate 133 and projecting forwardly therefrom are a pair of laterally spaced-apart, elongated measurement gauges 135, respectively extending forwardly through complementary openings in the support plate 123. Carried by the support plate 123 and projecting rearwardly therefrom is a stop member 136 for limiting the forward movement of the slide plate 133.

Preferably, each of the measurement gauges 135 is of the linear variable differential transformer (LVDT) type. A LVDT is an electromechanical transducer that produces an electrical output proportional to the displacement of a separate movable core. As the slide plate 133 is moved forwardly by the cylinder 134, the movable cores of the LVDT gauges, which project forwardly therefrom, engage the adjacent face of a grid 35 or nozzle 33 or 34 of the fuel assembly 30, and will be displaced or retracted relative to the supporting sleeve of the gauge 135 unil the slide plate 133 stops against the stop member 136. The gauge 135 produces an output signal which is proportional to the amount of retraction of the movable core thereof, which is in turn proportional to the distance of the face being measured from an associated reference plane parallel thereto.

The carriage assembly 120 also includes a cable weight roller 137 (FIG. 13) which is carried by a bracket 138 provided with bearings 139 disposed in sliding engagement with the rails 91 of the frame 80. In use, the hydraulic and electrical cables from the upper junction box 118 and associated hydraulic manifold 108 extend downwardly around the roller 137 and up to the junction box 124 and the hydraulic cylinders 134 on the carriage assembly 120. The cable weight roller 137 hangs freely and keeps the cables taut so as to prevent any tangling or interference with the vertical movement of the carriage assembly 120.

Referring now to FIGS. 4, 10 and 18, the operation of the measurement system 40 will be explained in detail. First of all, the underwater measurement assembly 50 is mounted in place and adjusted so that the strongback 85 is diposed substantially vertically and the top plate 81 is disposed substantially horizontally. Once the underwater measurement assembly 50 has thus been accurately positioned in the spent fuel pool 23, all further operations can be effected under remote control. First of all, the fuel assembly 30 is positioned in the underwater measurement assembly 50 in the measurement orientation, illustrated in FIGS. 4, 5 and 10, with the top nozzle 33 disposed in the cutout 82 of the top plate 81, and with the fuel assembly 30 hanging freely from its overhead handling crane. The fuel assembly 30 is rotated until opposite corners thereof face the arms 83 of the top plate 81, whereupon the upper clamp assemblies 100 are actuated to bring the clamping jaws 105 into engagement with the adjacent corners of the top nozzle 33 for preventing lateral movement thereof. Then the lower clamp assembly 95 is actuated to bring the support pad 99 up into engagement with the bottom nozzle 34 with a force sufficient to prevent sway of the fuel assembly 30 as a result of any lateral loads which might be applied by the measurement gauges 135.

Then, the carriage assembly 120 is moved to its uppermost or zero position illustrated in FIG. 4, that position being set to correspond to a predetermined output reading from the potentiometer 117. The upper limit switch 119 stops the carriage assembly 120 in the event it overruns the zero position. In this uppermost position, the carriage assembly 120 is disposed opposite the top nozzle 33. It is a significant aspect of the invention that when the underwater measurement assembly 50 is disposed in its measurement position illustrated in the drawings, the measurement gauges 135 are all disposed in a common horizontal plane which, in the uppermost position of the carriage assembly 120 passes through the top nozzle 33 intermediate the upper and lower ends thereof.

Next, the measurement gauges 135 are advanced against adjacent faces 36 of the top nozzle 33, moving into engagement therewith at four points which define two lines intersecting in a horizontal plane at a corner of the top nozzle 33. The measurement data from the gauges 135 are transmitted through the control console 45 to the computer 43 and are printed out by the printer 44.

The carriage assembly 120 is then moved downwardly along the fuel assembly 30, stopping at each grid 35 and at the bottom nozzle 34 at positions determined from the potentiometer 117 readings, to repeat the measurement process. At each of these measurement locations, the carriage assembly 120 will be so positioned that the plane of the gauges 135 passes through the associated grid 35 or bottom nozzle 34 intermediate the upper and lower ends thereof, the measurement data taken being printed out at each stage. At the bottom of the travel of the carriage assembly 120, the gauges 135 are advanced against the check plate 127 to verify the performance and repeatability of the measurements of the gauges 135. The bottom limit switch is actuated in the event of overrun of this check position.

The computer 43 then processes the raw data and calculates the bow, twist and tilt of the fuel assembly 30, and this information is then printed out by the printer 44. More specificaly, the computer 43 utilizes the measurement points to calculate two line equations which define lines lying along the adjacent faces of the nozzle or grid, and also to calculate the intersections of these lines which corresponds to a corner of the grid or nozzle. From this information the square defined by the intersection of the grid or nozzle with the measurement plane of the gauges 135 is determined, and vector techniques are used to compute the center of that square and its angular orientation with respect to reference coordinates.

The details of this process may better be understood by reference to FIG. 18. Programmed into the computer are orthogonal X, Y and Z coordinates, wherein the Z axis is parallel to the strongback 85, i.e., vertical in this case or perpendicular to the plane of the paper in FIG. 18. Thus, it will be appreciated that the XY plane is horizontal, being defined by the gauges 135, while the YZ and XZ planes are vertical, XZ plane preferably being defined by the strongback 85. The points A, B, C and D represent the points of engagement of the measurement gauges 135 with the faces of the grid or nozzle being measured. The output signals from the gauges 135 are proportional to the distances of the points A and B from the Y axis and the distances of the points C and D from the X axis. The gauges 135 corresponding to the points A and B are parallel to the X axis and spaced therefrom by distances b and a, respectively. Similarly, the gauges 135 corresponding to the points C and D are parallel to the Y axis and spaced therefrom by distances a and b, respectively. Since the distances a and b are known and programmed into the computer 43, this raw data provides the three-dimensional coordinates of the points A, B, C and D and permits calculation of the equations of the lines AB and CD and the extension thereof to their intersection at the point I, at a corner of the grid or nozzle being measured. Since the lengths of the sides of the nozzle or grid being measured are known, the coordinates of the other corners G, H and J thereof can be calculated. Next, the angle W that the line IG makes with the X axis is calculated, which will be equal to the angle V that the line IH makes with the Y axis. Then, the magnitude and direction of the vector OE is computed, and the vector OE is resolved into its X and Y components to identify the center point E of the square IHJG. This center E approximates the centroid of the grid or nozzle being measured.

Once the coordinates of the center E has been determined for each of the grids and nozzles 33–35, it is a simple matter to calculate the lines 140 and 143 in FIG. 16 and to determine the tilt of the fuel assembly 30 and the bow and twist thereof at each grid 35. In this regard, the angle W of inclination of the top nozzle 33 constitutes a zero reference and the corresponding angles for each of the other grids 35 and the bottom nozzles 34 are compared to this reference to give a measurement of the twist of the fuel assembly 30 at each such grid or nozzle.

After the measurement calculation operation is complete, the carriage assembly 120 is returned to its upper position in preparation for reception of the next fuel assembly 30 to be measured. The foregoing operations and calculations are performed under the control of a computer program, the flow chart for which is set forth in FIGS. 19–27.

Referring now to FIGS. 19–27, the operation of the system 40 will be explained in connection with the program for the computer 43. The program, which is generally designated by the numeral 150, is a menu-driven program and is arranged with great flexibility so that the user can selectively move freely from one subroutine to another. The program 150 has a main routine indicated by block 151 which proceeds to a block 152 for storing data on the geometry of various types of fuel assemblies, and a block 153 for bringing up a main menu, which is illustrated in FIG. 20. When the main menu is called up, the program initially turns off all the "Soft Keys" or function keys, and then turns on those needed for the main menu selections. The menu is displayed and, on the actuation of any of the illustrated function keys to select a menu function, the keyborad is disabled, the time and date are printed out and the program proceeds to the selected subroutine.

From the main menu, the user may select a number of functions, including a "Heading-Info" function at block 154, a "Print-Out" function at block 155, a "Copy-Data" function at block 156, an "Input-Data" function at block 157, an "Auto-Inspection" function at block 158 and a "Set-Up" function at block 159. Upon actuation of a selected "Soft Key", the main menu is turned off at block 160, and the program enters the selected subroutine.

Figure 21:
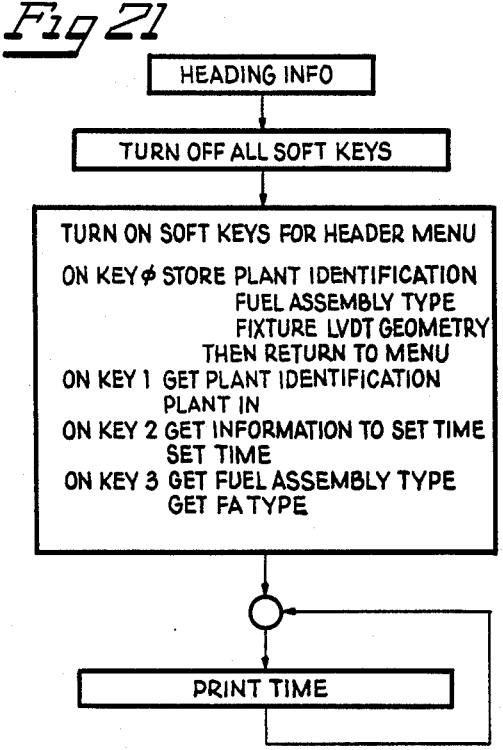
Figure 23:
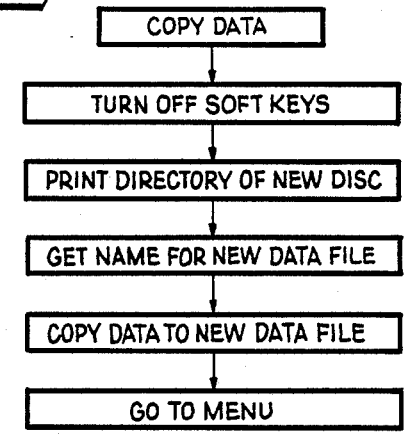

Initially, the user would typically call up the "Heading-Info" subroutine from the main menu, which subroutine is illustrated in FIG. 21. This subroutine turns off all the Soft Keys, turns on the Soft Keys needed for selection from a header menu and displays the header menu. From this menu, the user can select a "Plant-In" subroutine for entering plant identification information, a "Set-Time" subroutine for setting the current date and time and a "Get-FA-Type" subroutine for inputting information relative to the type of fuel assembly to be measured. Once that fuel assembly information is input, the program automatically proceeds to the block 152 to enter the geometry information for that type of fuel assembly. It will be noted that after each one of these menu functions is selected and the necessary information is input, the "0" Soft Key stores the input information and returns the user to the header menu. Each time a Soft Key is actuated from the main menu, the keyboard is disabled and the time is printed. The user can also turn off the main program loop from the "Heading-Infor" subroutine.

Figure 27:
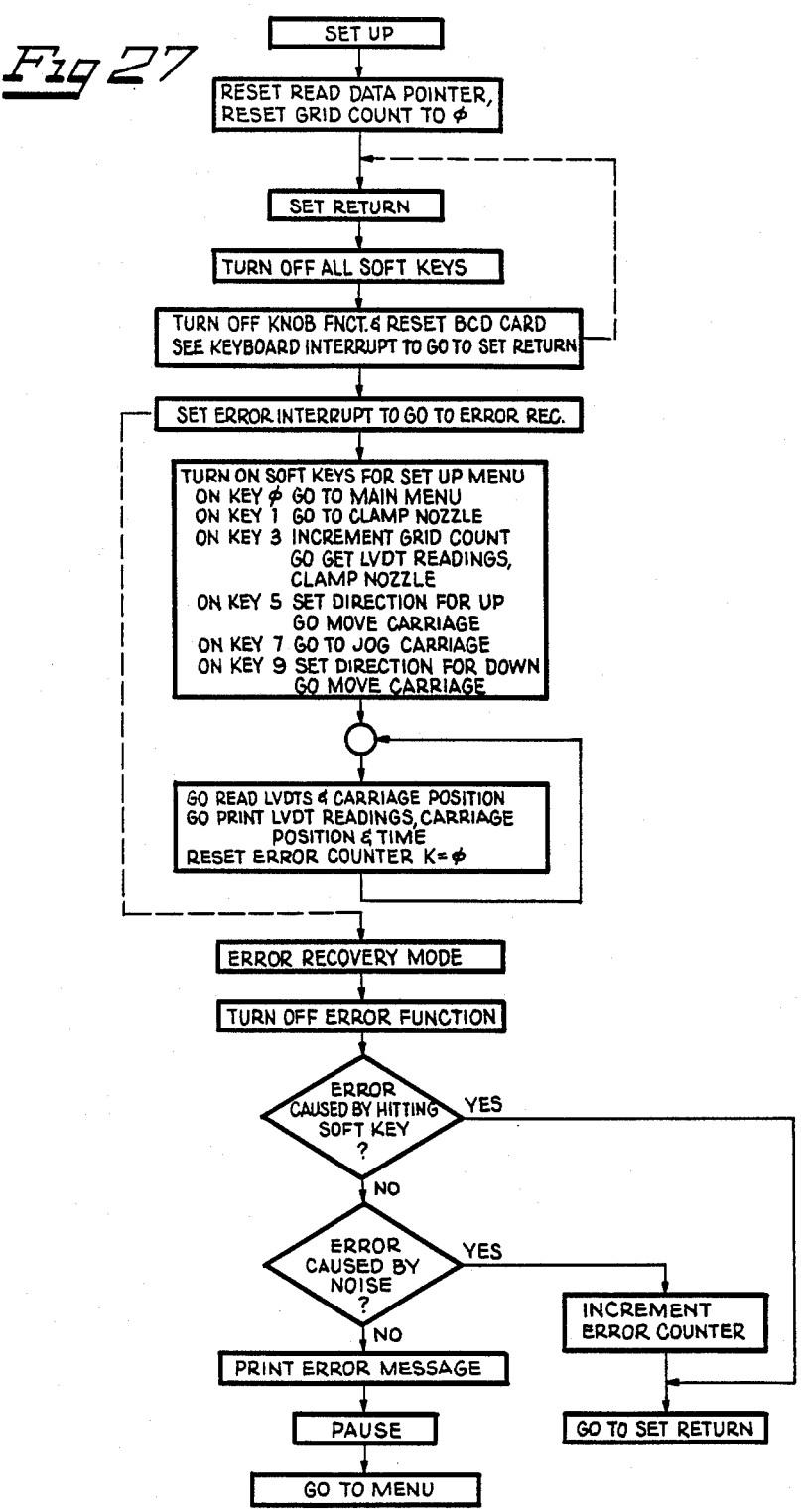

In normal field operations, after the heading information has been entered, the "Set-Up" subroutine is operated to calibrate the underwater measurement assembly 50, including the LVDT gauges 135 thereof. Referring to FIGS. 1 and 27, the "Set-Up" subroutine, after performing reset functions, goes through a "Set-Return" function, turns off all Soft Keys and the knob functions, sets the keyboard interrupt to go to the "Set-Return" function and sets the error interrupt to go to an error recovery mode, which is self-explanatory. Then the subroutine turns on the Soft Keys needed for the "Set-Up" menu and displays the menu. The menu permits selection of a number of functions by the user.

Typically, the user will first select the "Clamp-Nozzle" function, whereupon the program moves to block 161 (FIG. 19). This function activates a nozzle clamp solenoid valve for clamping the frame 80 to the fuel assembly top nozzle 33. The user may then perform a number of calibration functions. In a "Set-Carriage" function at block 162 (see FIG. 19) the operator, by keyboard control, drives the carriage assembly 120 to a number of known positions, preferably adjacent to the top, middle and bottom of the strongback channel 85, to calibrate the distance measuring apparatus with respect to the normal rest or zero position of the carriage 120 at the top of the frame 80. In the "Read-Standard" function at block 163, the user can check to see if the underwater measurement assembly 50 may have been distorted, during shipping, for example, The carriage 120 is moved to several predetermined checkpoints along a square standard (not shown) and the LVDT gauges 135 are read and, if the underwater measurement assembly 50 is out of square, appropriate compensations are made.

In the "Set-LVDTS" function at block 164, each of the LVDT gauges 135 is engaged with the check plate 127 and readings are taken to calibrate the LVDT gauges 135. The carriage 120 is moved up to the top of the frame 80 and is then driven down to a predetermined location along the check plate. The LVDT gauges 135 are clamped on in their measuring positions, read, the reading is converted into inches and printed, and then the LVDT gauges 135 are released and the carriage 120 is moved down to the next position.

In performing each of these calibration functions, the user can selectively drive the carriage 120 up and down by appropriate selections on the "Set-Up" menu (FIG. 27). For example, to move the carriage 120 up, Soft Key 5 would be actuated, whereupon the program would proceed to the "Move-Carriage" function at block 165 (FIG. 19) to drive the carriage 120 up until the user tells it to stop. The "Jog-Carriage" function can be selected to move the program to block 166 (FIG. 19) for fine or precise positioning of the carriage 120 at a selected location.

Figure 25:
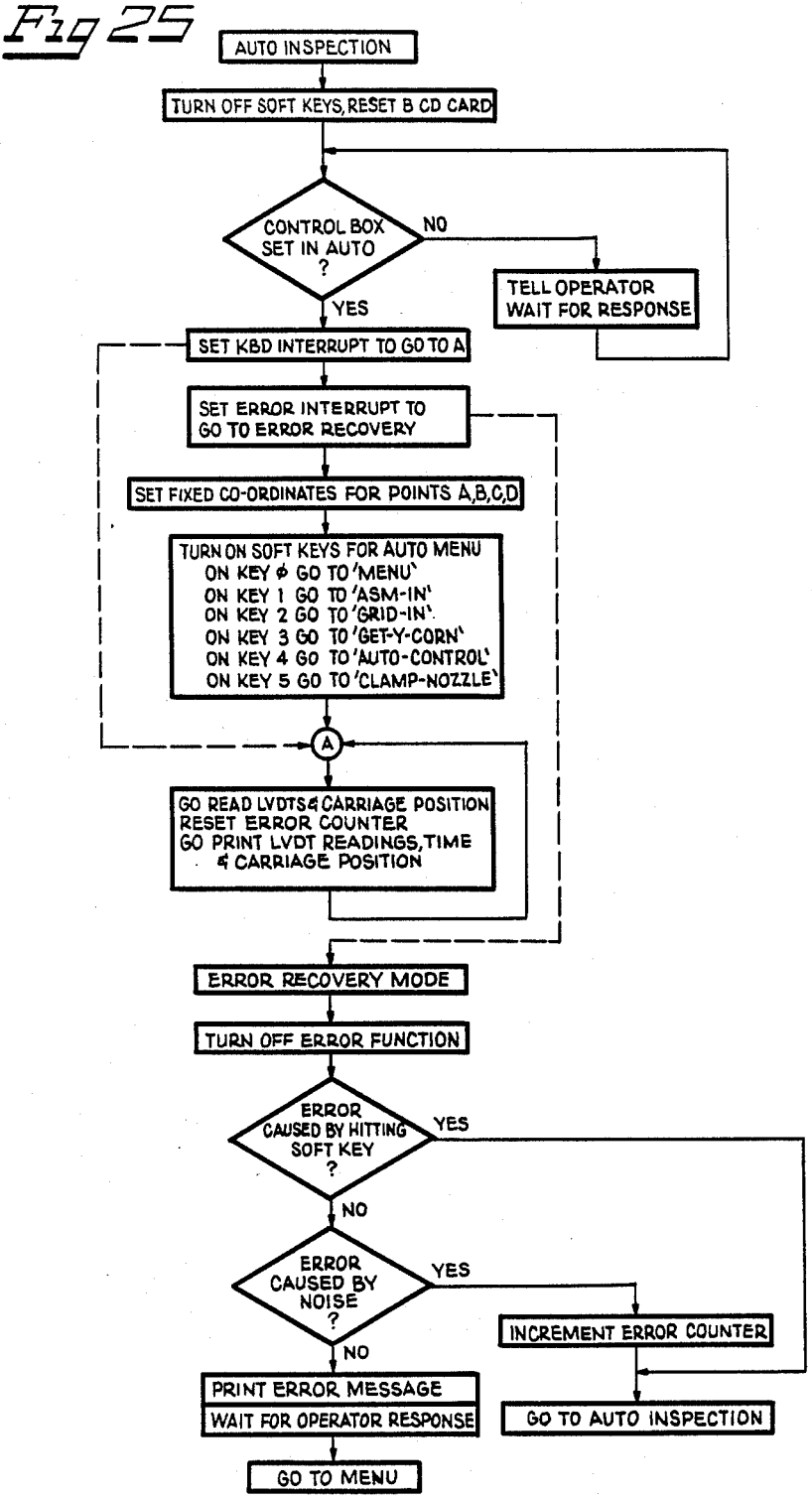
Figure 26:
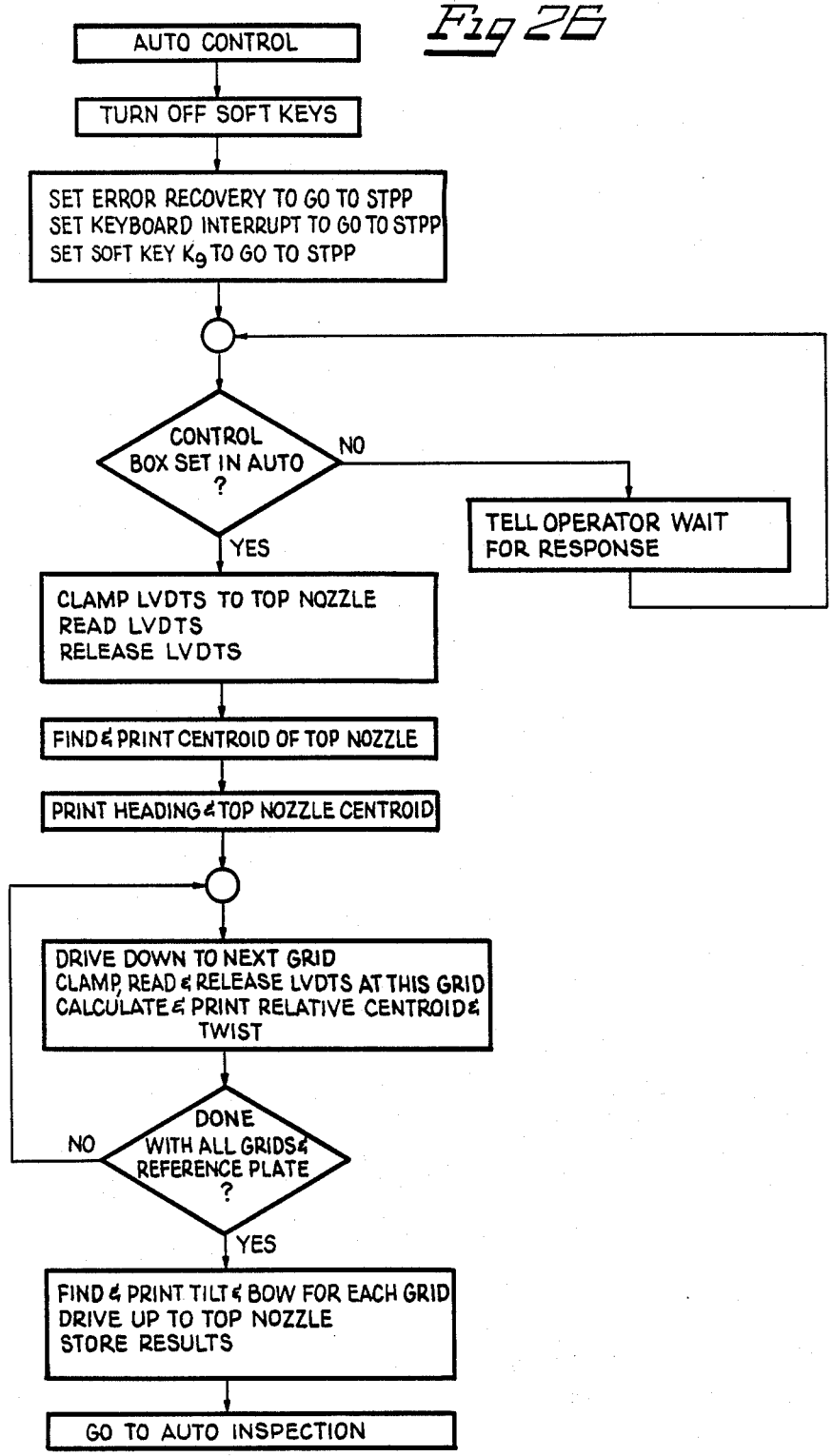

After the set up procedures have been completed, the user returns the main menu and selects the "Auto-Inspection" subroutine. Referring to FIG. 25, the "Auto-Inspection" subroutine first turns off the Soft Keys and resets a BCD card and then checks to see if the control box is set in the automatic mode. If it is not, the program informs the operator and waits for a response and then again checks the control box. If it is in the automatic mode, the program sets the keyboard interrupt to go to point A and sets the error interrupt to go to a self-explanatory error recovery mode. The program sets fixed coordinates for predefined points on the underwater measurement assembly 50, then turns on Soft Keys necessary for the auto menu then displays that menu.

Through the auto menu (FIG. 25), the user can select a "Clamp-Nozzle" function (block 167, FIG. 19), which is similar to that described above with respect to the "Set-Up" subroutine; an "ASM-In" function (block 168) for inutting fuel assembly identification information; a "Grid-In" function (block 169) for inputting information regarding the depth of the fuel assembly grids 35 below the top nozzle 33; and a "Get-Y-Corn" function (block 170) for inputting data on the location of a predetermined corner of the fuel assembly 30, thereby defining its rotational orientation. After the necessary information has been input, the user selects the "Auto-Control" subroutine, illustrated in FIG. 26.

In the "Auto-Control" subroutine, the program automatically conducts an inspection of the fuel assembly 30, taking the necessary measurements for determining bow, twist, and tilt. The subroutine first turns off the Soft Keys, sets the error recovery, keyboard interrupt and a predetermined Soft Key to go to a "STPP" routine to stop the program until a user command is received. Next, the subroutine checks to see if the control box is set in the automatic mode. If it is not, it informs the operator and waits for a response. If it is, it clamps the LVDT gauges 135 to the top nozzle, reads them and releases them.

With the data read the program finds and prints the centroid of the top nozzle and prints out that information along with the appropriate heading, then automatically moves the carriage 120 down to the next grid 35. At that grid, the clamping, reading, releasing, calculating and printing functions are repeated and then the program asks if all the grids have been completed. If they have not the program continues driving the carriage down to each grid until all the grids have been completed. Then the subroutine finds and prints the tilt and bow for each grid and drives the carriage back up to the top nozzle and stores all the results, and returns to the beginning of the "Auto-Inspection" subroutine and then to the auto menu.

Throughout the "Set-Up" and "Auto-Inspection" subroutines, whenever the LVDT gauges are read, the readings are also converted from volts to inches by a "Convert-LVDT" function.

Figure 24:
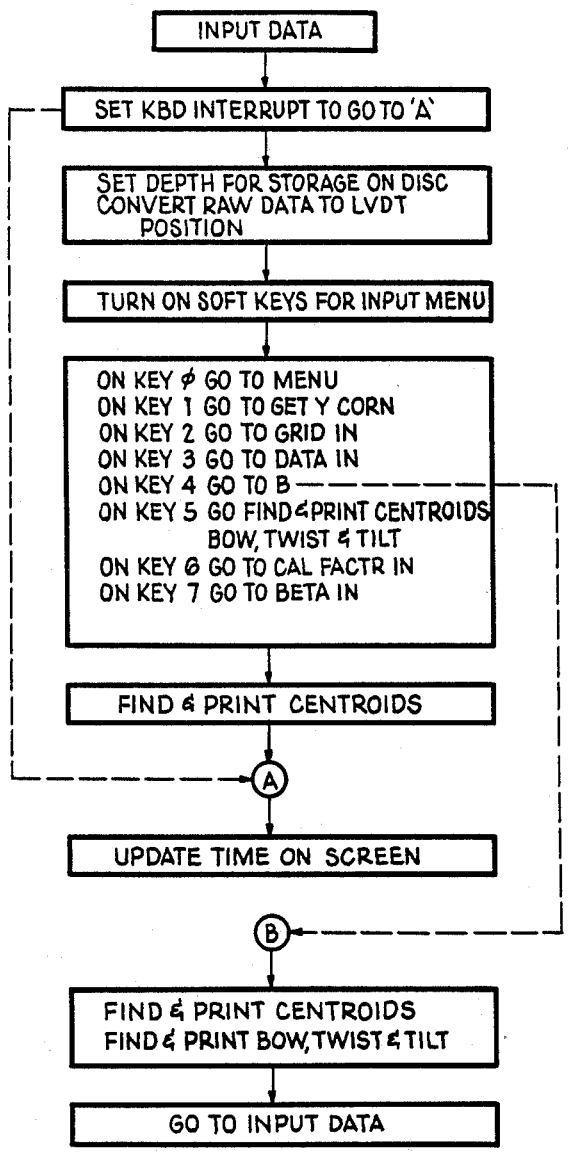

The program 150 also makes it possible to manually key data into the computer, by selection of the "Input-Data" subroutine from the main menu. This might be necessary, for example, if the computer were not operating during a field inspection, in which case the measurements read would have to be written down and later keyed into the computer. Referring to FIG. 24, the "Input-Data" subroutine first sets the keyboard interrupt to go to a point A, sets the program to convert raw data to LVDT gauge position, turns on the necessary Soft Keys for the input menu and displays that menu.

The user can select "Get-Y-Corn" and "Grid-In" functions which are the same as those described above in connection with "Auto-Inspection" subroutine. By selecting the "Data-In" function the user can key in the LVDT gauge data. The "Beta-In" function is for entry of a correction factor in the event that the strongback channel 85 is not perfectly vertical, while the "Cal-Factr-In" function is for entry of a calibration factor for the LVDT gauges if they are not standard. When all the necessary data and information has been keyed in, the user can direct the computer to find and print the centroids, bow, twist and tilt for the fuel assembly, after which the program will exit the menu and update the time on the screen. Alternatively, the user can direct the program to go to point B where it will immediately find and print the centroids, bow, twist and tilt and then return to the input menu.

Figure 22:
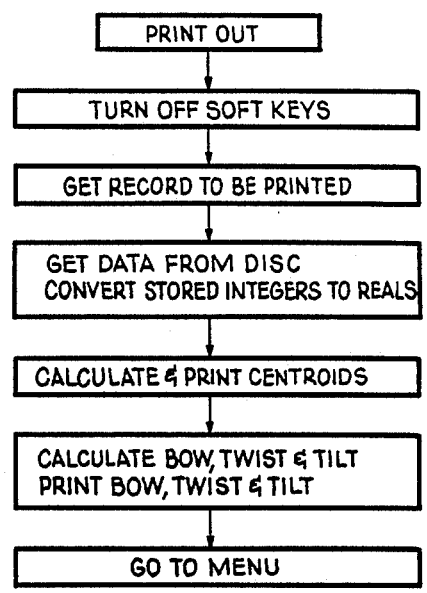

When it is desired to print out data independently of an "Auto-Inspection" function, the user can select the "Print-Out" subroutine from the main menu. Referring to FIG. 22, this subroutine turns off the Soft Keys, gets the record to be printed from the disk storage, converts the data and calculates and prints the centroids, bow, twist and tilt and then returns to the main menu.

The "Copy-Data" subroutine (FIG. 23) may be selected from the main menu for the purpose of transferring data from one disk drive to another for providing backups at the end of each day's work.

It is a significant aspect of the present invention that it accommodates fuel assembly types of different lengths and different envelope dimensions. Preferably, the system will accommodate fuel assembly envelope deviations of $+/-2.00$ inches from the vertical reference line 140, the measurements being accurate to within $+/-0.030$ inches. While, in the preferred embodiment, the underwater measurement assembly 50 is mounted from the pool deck 24 it could also be floor mounted at the bottom of the pool 23. The deck mounted configuration disclosed permits the entire underwater measurement assembly 50 to be adjusted and leveled from the deck 24 without underwater tools.

It is another aspect of the invention that all measurements are taken with the fuel assembly 30 in an essentially free hanging condition on a handling crane. There is no need to release and re-engage the fuel assembly 30 with the overhead handling crane. Furthermore, the fuel assembly measurements can be made without a need to clamp the fuel assembly 30 in a precise location, since all measurements are made relative to the position of the top nozzle 33.

Additionally, it will be noted that the system components are relatively lightweight and portable for service applications. The measurement system 40 utilizes a fully automatic computer control to keep test time under about five minutes per fuel assembly 30. This permits the system 40 to keep up with the refueling operations. An override control may also be included to allow a manual mode of operation utilizing the TV camera 126 for monitoring the measurement operation.

From the foregoing, it can be seen that there has been provided an improved apparatus which permits determination of the bow, twist and tilt of a nuclear fuel assembly, the system being lightweight, accurate, easy to use and capable of manual or automatic remote operation, and being readily adaptable to fuel assembly types of different lengths and envelope dimensions, and which does not require disconnection of the fuel assembly from its handing tool or clamping of the fuel assembly in a precise location.

We claim as our invention:

1. Apparatus for determining external dimensional relationships of a nuclear fuel assembly including an array of elongated fuel rods engaged in transverse grids and extending between top and bottom nozzles, said apparatus comprising: support means, positioning means on said support means for fixedly positioning the fuel assembly in a selected orientation to establish a first portion of the fuel assembly as a reference, carriage means mounted on said support means for movement longitudinally of the fuel assembly substantially the entire length thereof when it is disposed in said selected orientation, measuring means on said carriage means, and drive means on said carriage means for moving said measuring means between a retracted condition and a measuring condition disposed in measuring engagement with a second portion of the fuel assembly to measure the position and orientation of said second portion relative to said reference, and processing means responsive to said measurements of said second portion for determining said external dimensional relationships of the fuel assembly.

2. The apparatus of claim 1, wherein said positioning means includes means for engaging the top and bottom nozzles for retaining the fuel assembly in said selected orientation.

3. The apparatus of claim 1, wherein said selected orientation is with the direction of elongation of the fuel assembly disposed substantially vertically.

4. The apparatus of claim 1, and further including control means coupled to said positioning means and said carriage means and said drive means for remotely controlling the operation thereof.

5. The apparatus of claim 4, wherein said control means includes video camera means mounted on said carriage means for viewing the measurement operation.

6. The apparatus of claim 1, wherein said measuring means includes a plurality of measuring gauges respectively engageable with the fuel assembly at a plurality of measurement points.

7. The apparatus of claim 6, wherein each of said measuring gauges measures the distance of its associated measuring point from a fixed reference plane.

8. Apparatus for determining external dimensional relationships of a nuclear fuel assembly including an array of elongated fuel rods engaged in transverse grids and extending between top and bottom nozzles, wherein each of said grids and nozzles has external planar faces arranged in a rectangular configuration, said apparatus comprising: support means, reference means mounted on said support means for cooperation therewith to define mutually perpendicular X and Y and Z reference axes and XZ and YZ reference planes, positioning means on said support means for fixedly positioning the fuel assembly in a selected orientation with the faces of the top nozzle disposed parallel to said Z axis, measuring means carried by said support means for establishing on adjacent faces of each of the grids and nozzles a plurality of measurement points in a measurement plane perpendicular to said Z axis and measuring the distances of said points from said XZ and YZ planes, and processing means for calculating from said measured distances the location of the centre of each of the grids and nozzles in its associated measurement plane and further calculating from said center locations the tilt of the fuel assembly and the bow and twist of the fuel assembly at each of the grids thereof.

9. The apparatus of claim 8, wherein said measuring means includes a plurality of measuring gauges respectively engageable with a selected one of said grids and nozzles at said measurement points thereon.

10. The apparatus of claim 9, wherein said measurement means includes two measurement gauges movable parallel to said XZ plane and disposed at predetermined distances from said YZ plane and two measurement gauges movable parallel to said YZ plane and disposed at predetermined distances from XZ plane, whereby the coordinates of said measurement points are determined by said predetermined distances and said measured distances.

11. The apparatus of claim 8, wherein said support means is disposed so that said Z axis is substantially vertical.

12. The apparatus of claim 8, wherein said processing means includes a computer under program control.

13. The apparatus of claim 8, and further including control means coupled to said positioning means and to said measuring means for remotely controlling the operation thereof.

14. The apparatus of claim 13, wherein said reference means includes carriage means movable parallel to said Z axis, said measuring means being mounted on said carriage means, said control means being coupled to said carriage means for remotely controlling the operation thereof.

15. Apparatus for determining external dimensional relationships of a nuclear fuel assembly including an array of elongated fuel rods engaged in transverse grids and extending between top and bottom nozzles, wherein each of said grids and nozzles has external planar faces arranged in a rectangular configuration, said apparatus comprising: support means, carriage means mounted on said support means for cooperation therewith to define mutually perpendicular X and Y and Z reference axes and XY and XZ and YZ reference planes, positioning means on said support means for fixedly positioning the fuel assembly in a selected orientation with the faces of the top nozzle disposed parallel to said Z axis, said carriage means and said XY plane being movable parallel to said Z axis and generally longitudinally of the fuel assembly among a plurality of measuring locations respectively disposed adjacent to said nozzles and said grids with said XY plane defining a measurement plane intersecting the faces of the adjacent nozzle or grid, a plurality of measuring means mounted on said carriage means for movement in said XY plane into and out of measuring engagement with intersecting faces of the adjacent nozzle or grid for establishing on the faces a plurality of measurement points and measuring the distances of said points from said XZ and YZ planes, control means for controlling the movement of said carriage means and said measuring means, and processing means for calculating from said measured distances the location of the center of each of the grids and nozzles in its associated measurement plane and further calculating from said center locations the tilt of the fuel assembly and the bow and twist of the fuel assembly at each of the grids thereof.

16. The apparatus of claim 15, wherein said positioning means includes means movable into engagement with the top and bottom nozzles for retaining said fuel assembly in said selected orientation.

17. The apparatus of claim 16, wherein said control means includes means coupled to said positioning means for controlling the operation thereof.

18. The apparatus of claim 15, and further including chain drive means coupled to said carriage means for effecting movement thereof, and fluid drive means coupled to said positioning means and to said measuring means for effecting movement thereof.

19. The apparatus of claim 15, wherein said support means includes adjusting means for adjusting the orientation of said Z axis.

20. The apparatus of claim 15, wherein said processing means includes computer means operating under program control.

* * * * *